(12) United States Patent
Aoshima et al.

(10) Patent No.: US 9,316,242 B2
(45) Date of Patent: Apr. 19, 2016

(54) FIXTURE FOR FASTENING

(71) Applicant: NEWFREY LLC, Newark, DE (US)

(72) Inventors: Yuuki Aoshima, Toyohashi (JP); Kazuhito Yamamoto, Toyota (JP)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 14/607,618

(22) Filed: Jan. 28, 2015

(65) Prior Publication Data

US 2015/0139754 A1    May 21, 2015

Related U.S. Application Data

(63) Continuation of application No. PCT/JP2013/069323, filed on Jul. 16, 2013.

(30) Foreign Application Priority Data

Jul. 30, 2012    (JP) ................................. 2012-168820

(51) Int. Cl.
   *F16B 19/10*    (2006.01)
   *F16B 19/00*    (2006.01)
   *F16B 13/12*    (2006.01)
   *F16B 5/06*     (2006.01)
   (Continued)

(52) U.S. Cl.
   CPC .............. *F16B 19/004* (2013.01); *F16B 5/0642* (2013.01); *F16B 13/126* (2013.01); *F16B 19/109* (2013.01); *F16B 19/1081* (2013.01); *F16B 21/065* (2013.01); *F16B 21/086* (2013.01)

(58) Field of Classification Search
   CPC ...... F16B 19/1081; F16B 13/126; F16B 19/04
   USPC ........................................ 411/45–48
   See application file for complete search history.

(56) References Cited

U.S. PATENT DOCUMENTS

| 6,511,108 B1 * | 1/2003 | Roessner, III .......... B65D 55/06 24/16 PB |
| 6,910,840 B2 * | 6/2005 | Anscher .............. F16B 19/1081 411/41 |
| 7,273,227 B2 | 9/2007 | Kawai et al. |

(Continued)

FOREIGN PATENT DOCUMENTS

| JP | 2008248966 A | 10/2008 |
| JP | 4768254 B | 9/2011 |

OTHER PUBLICATIONS

Chinese Office Action Dated Dec. 2, 2015.
(Continued)

*Primary Examiner* — Flemming Saether
(74) *Attorney, Agent, or Firm* — Michael P. Leary

(57) ABSTRACT

A fixture for fastening an attaching member to a mounting member includes a pin and a bushing, the bushing including a flange and a leg part. The leg part defines shaft-part receiving openings for receiving shaft parts of the pin, the shaft-part receiving openings being enclosed by an outer wall having a rectangular cross section. A pair of opposing elastic engagement claws are disposed at one pair of opposing outer wall portions of the outer wall. A leg center column is disposed between the shaft-part receiving openings. The leg center column connects the one pair of opposing outer wall portions with another pair of outer wall portions that are perpendicular to the one pair of outer wall portions.

7 Claims, 8 Drawing Sheets

(51) Int. Cl.
*F16B 21/06* (2006.01)
*F16B 21/08* (2006.01)

(56) References Cited

U.S. PATENT DOCUMENTS

| | | |
|---|---|---|
| 7,841,817 B2 | 11/2010 | Kawai |
| 8,043,038 B2 | 10/2011 | Sano |
| 9,115,743 B2 * | 8/2015 | Yamamoto ............ F16B 21/065 |
| 2007/0003390 A1 * | 1/2007 | Kawai ................. F16B 19/1081 411/48 |
| 2012/0315108 A1 * | 12/2012 | Seino .................. F16B 19/1081 411/343 |

OTHER PUBLICATIONS

Japanese Office Action Dated Jul. 27, 2015.

* cited by examiner

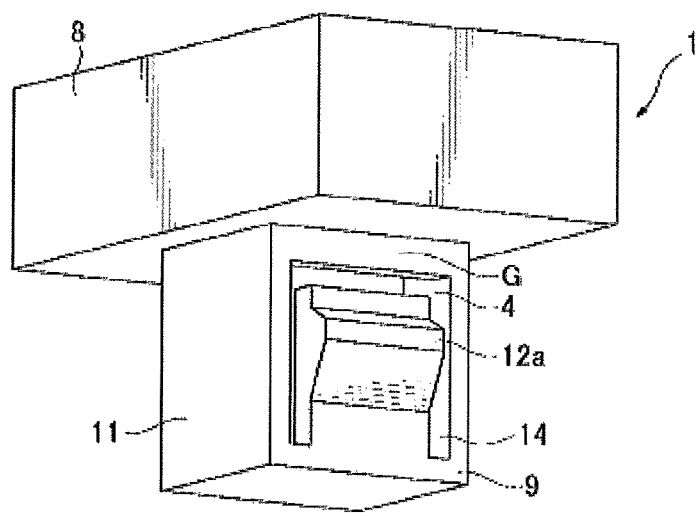
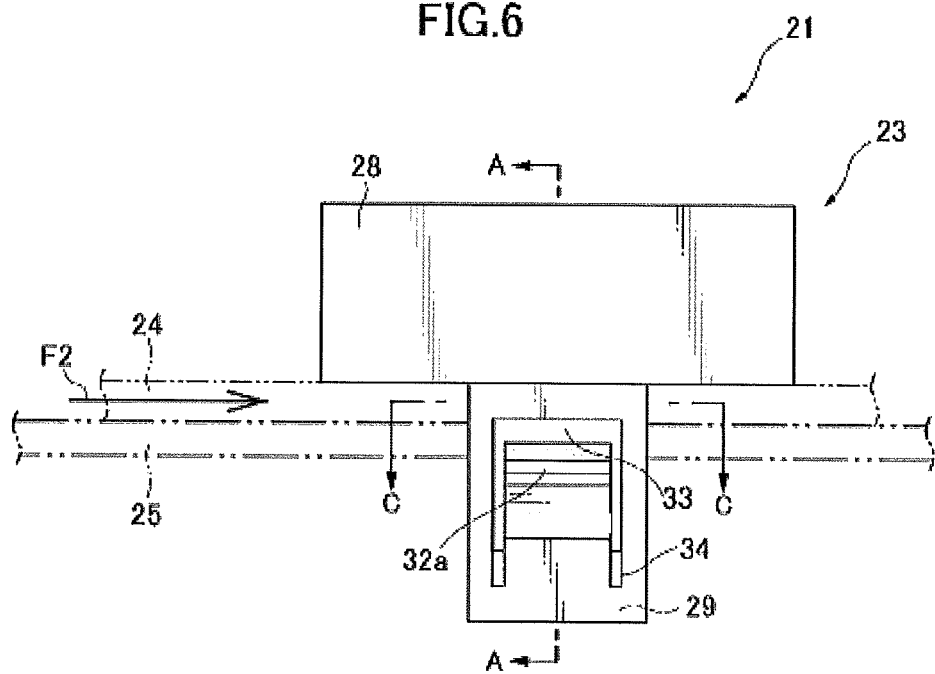

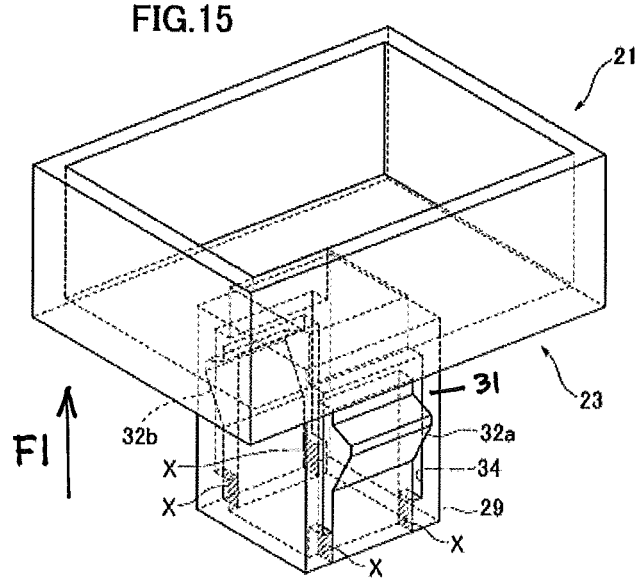
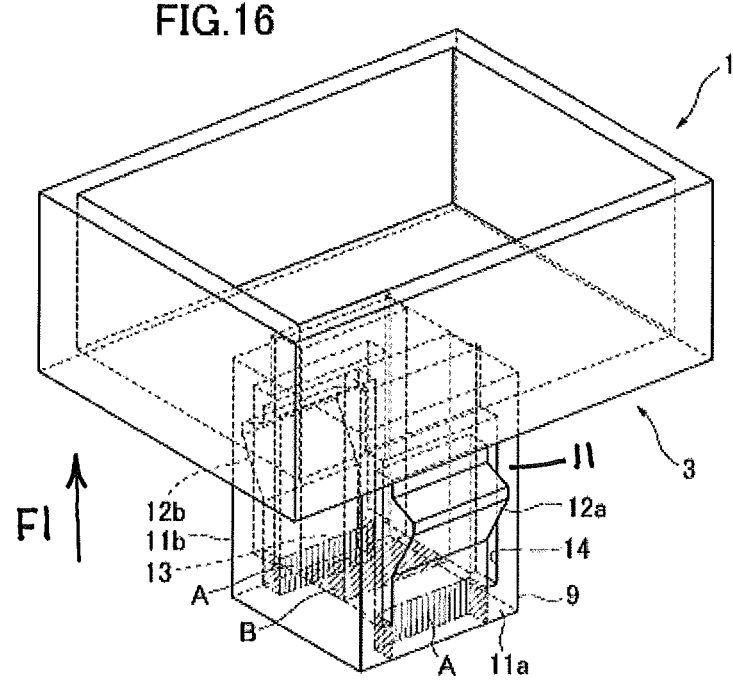

US 9,316,242 B2

FIXTURE FOR FASTENING

CROSS-REFERENCE TO RELATED APPLICATIONS

This application is a continuation of PCT/JP2013/69323, filed on Jul. 16, 2013, which claims priority from Japanese Patent Application No. 2012-168820, filed on Jul. 30, 2012, the disclosure of which is incorporated herein by reference.

BACKGROUND OF THE PRESENT INVENTION

The present invention concerns a fixture and in particular, a fixture which can fasten an attaching member to a mounting member with relatively little force.

A prior art fixture is shown in patent reference 1, which discloses an airbag mounting member with an attaching member and a clip that is mounted on the body panel of a mounting member. This clip consists of a bushing that receives a pin; it is constructed by disposing two elastic locking pieces that protrude elastically outwards to the leg part side of the bushing and sandwiching both elements with said elastic locking piece and the flange of the bushing. A shaft hole that receives the pin is disposed on the leg part and the elastic locking piece is stopped so that, if the pin is inserted into the shaft hole, bending towards the inside of the shaft hole is obstructed and, if the pin is not in the shaft hole, it becomes temporarily fixed, which allows bending to the inside of the shaft hole.

Patent reference 2 discloses a fixture that uses four elastic locking pieces. This fixture has an axial post inside the shaft part (leg part), on which axial post several shaft holes are disposed. Then, several leg parts (shaft parts) are inserted into these shaft holes. Also, the leg part (shaft part) of the bushing connects to the back (underside) of the flange of the bushing and an opening is disposed therein to form elastic locking pieces in one part of the shaft part (leg part) in which an elastic locking piece is disposed; this opening reaches all of the way up from the shaft part (leg part) of the flange to the underside of the flange.

PRIOR ART REFERENCES

Patent Reference 1: Japan Patent 2005-047325
Patent Reference 2: Japan Patent 2010-144900

SUMMARY OF THE PRESENT INVENTION

One problem of the fixture of Patent Reference 1, as shown in FIGS. 6 to 8, is that the resistance to shear stress is weak because a columnar construction is not disposed inside the leg part of the bushing. In the fixture of Patent Reference 2, a certain amount of resistance to vertical stress and shear stress was obtained by using four elastic locking pieces; however, there is still a problem, as shown in FIG. 13, in that a strong resistance to input (torsional input) from the side opposite the back of the flange was not obtained because the opening for forming the elastic locking piece reaches all of the way up from the shaft part (leg part) to the underside of the flange.

The object of the present invention is to provide a fixture which has a strong resistance to vertical stress, shear stress and torsional stress.

According to the present invention, a fixture includes a pin and a bushing, and after temporarily fixing the bushing to a attaching member and a mounting member, then inserting the pin into the bushing, the fixture connects the attaching member to the mounting member. The pin includes a head part and a shaft part extending from the head part. The bushing includes a flange and a leg part extending from the flange; the leg part has shaft-part receiving openings that receive the shaft part of the pin, an outer wall that surrounds the shaft-part receiving openings, a pair of opposing elastic engagement claws disposed on a portion of the outer wall, and a leg center column disposed in the center of the shaft-part receiving openings. The leg center column and the outer wall form a flange connecting part which connects the leg part and the flange. A portion of the wall forming the flange connecting part also forms a reinforcing arch that extends from one wall portion to an opposing wall portion, and is disposed above the opening that defines the elastic engagement claws. The leg center column connects one pair of wall portions where the elastic engagement claws are disposed to another pair of opposing wall portions, which are perpendicular to the one pair of wall portions.

According to one characteristic of the present invention, the end point of the side opposite the flange connecting part of the leg part has a closed end construction in order to close off the shaft-part receiving opening.

According to another characteristic of the present invention, the leg part is defined by outer walls having a square cross-section; the pair of elastic engagement claws are disposed on a pair of opposing outer wall portions; and the leg center column connects the other perpendicular pair of outer wall portions with the pair of outer wall portions having the engagement claws.

According to yet another characteristic of the present invention, the shaft-part receiving openings of the leg part includes a pair of spaces divided into parts by the leg center column, and the shaft parts of the pin are bifurcated in order to be received into the pair of spaces.

According to another characteristic of the present invention, the elastic engagement claws protrude elastically outward from the outer walls; when temporarily fixed, the elastic engagement claws return elastically to protrude outward after bending temporarily inward in order to pass through the mounting holes of the attaching member and the mounting member and, when stopping, they are so constructed that bending inward is obstructed when the shaft parts are inserted into the shaft-part receiving openings.

According to still another characteristic of the present invention, the leg center column, when temporarily fixed, is constructed so that it forms enough space between the outer walls for the elastic claws to bend inward.

According to another characteristic of the present invention, the cross-sectional area of the leg part is augmented by extending it towards the shaft-part receiving openings so that the inner walls of the other pair of outer wall portions approach each other.

According to the fixture of the present invention, the flange connecting part of the leg part of the bushing is defined by the leg center column and by a portion of the outer wall of the leg part, a portion of the outer wall of the flange connecting part forming a reinforcing arch over the top of the entire opening that defines a slit that extends around an elastic engagement claw. The arch thus extends from one wall to the opposing wall. The leg center column is disposed in the center of the shaft-part receiving opening and possesses a strong resistance to vertical stress, shear stress and torsional stress in part because it connects the outer wall portions where the elastic engagement claws are disposed, with the other opposing outer wall portions.

BRIEF DESCRIPTION OF THE DRAWINGS

FIG. 5 is an outline oblique view showing one part of the fixture of FIG. 1.

FIG. 6 is a front view similar to FIG. 1 showing one example of a fixture of the prior art.

FIG. 15 is a partial see-through oblique view of FIG. 6 to illustrate the resistance of a fixture of the prior art when it receives a vertical stress.

FIG. 16 is a partial see-through oblique view of FIG. 1 to illustrate the resistance of a fixture of the present invention when it receives a vertical stress.

DETAILED DESCRIPTION OF THE PREFERRED EMBODIMENTS

Figure 10:
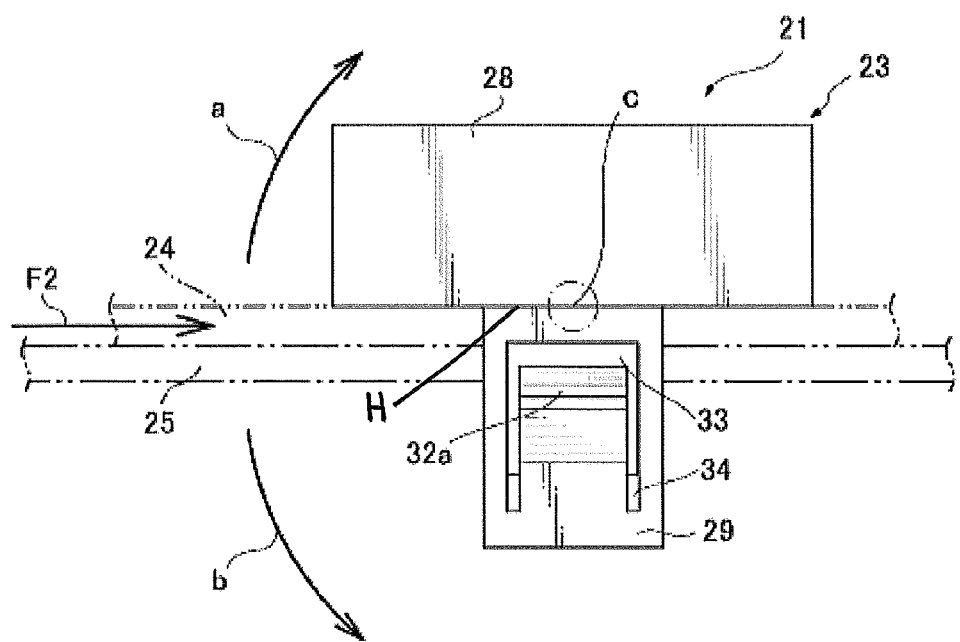
FIG. 10 is a similar drawing to FIG. 6 to illustrate shear stress.
Figure 11:
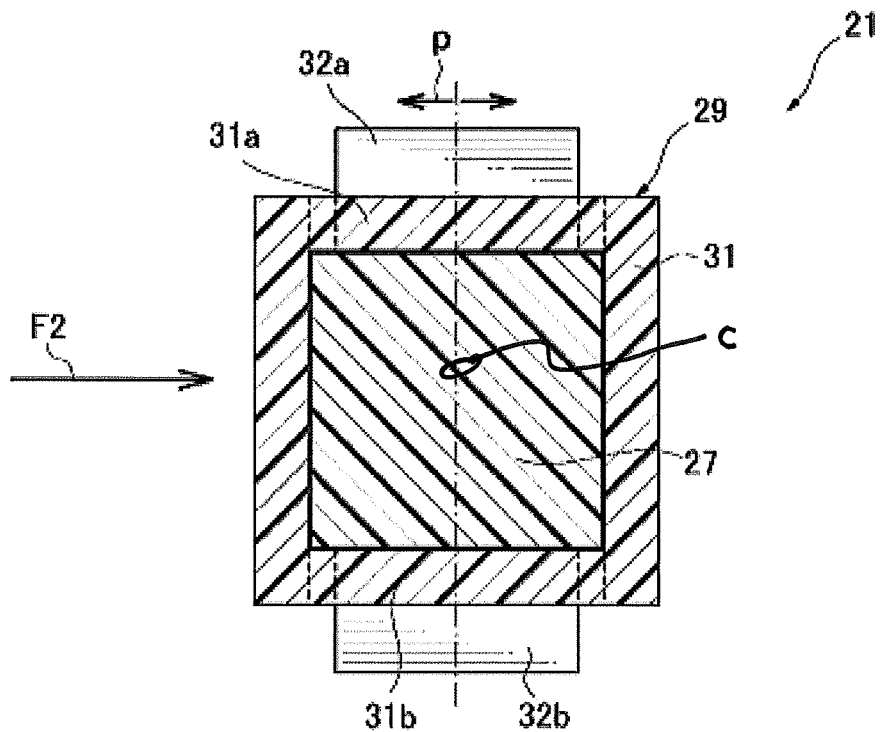
FIG. 11 is a similar drawing to FIG. 9, also to illustrate the shear stress on a fixture of the prior art.
Figure 12:
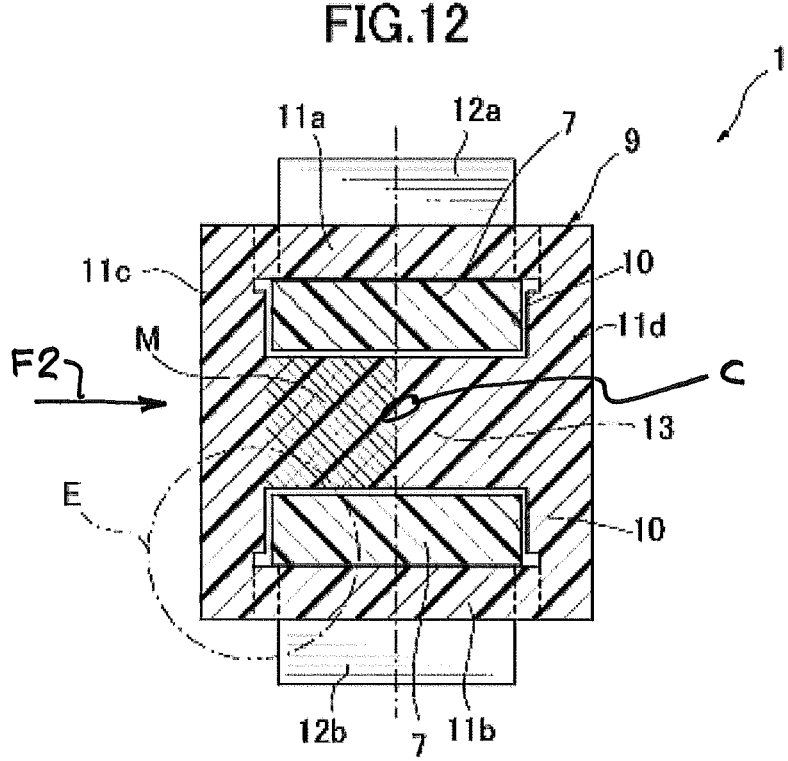
FIG. 12 is a similar drawing to FIG. 4 to illustrate the shear stress on the fixture of the present invention.

Below is described an embodiment of the fixture of the present invention, as illustrated by the Drawings. FIGS. 1 to 5 and FIG. 14 show a fixture according to a working example of the present invention; FIGS. 6 to 9 and FIG. 13 show examples of fixtures of the prior art to illustrate the differences in construction with the fixture of the present invention shown in FIGS. 1 to 5; and FIGS. 10 to 12 show a similar drawing to FIGS. 6, 9 and 14 to illustrate shear stress in a fixture of the prior art. Also, FIGS. 15 and 16 show partial see-through oblique views of a fixture of the prior art and the fixture of the present invention, respectively, to illustrate resistance when they receive respective vertical stresses.

As shown in FIGS. 1 to 5, the fixture of the present invention includes a pin 2 and bushing 3. In this fixture 1 (compare fixture 21 of the prior art shown in FIG. 6), after temporarily fixing the bushing 3 to the attaching member 24 and the mounting member 25 (see FIG. 6), the attaching member 24 is locked to the mounting member 25 when the pin 2 is inserted into the bushing 3.

The pin 2 comprises a head part 6 and a shaft part 7 that extends from the head part, and the bushing 3 includes a flange 8 and a leg part 9 that extends from the flange 8. The leg part 9 has shaft-part receiving openings 10 that receive the shaft part 7 of the pin 2; these shaft-part receiving openings 10 are enclosed by an outer wall 11 (FIG. 5) having a rectangular cross section. In one preferred embodiment of the fixture of the present invention, the outer wall 11 has a square cross section. A pair of opposing elastic engagement claws 12a, 12b is disposed on a pair of opposing wall portions 11a, 11b of a portion of the outer wall 11.

For purposes of contrast, this construction may be compared to a fixture 21 of the prior art shown in FIGS. 6 to 9. That is, the fixture 21 of the prior art includes a pin 22 and a bushing 23. In this fixture 21, after temporarily fixing the bushing 23 to the attaching member 24 and the mounting member 25, the attaching member 24 is fastened to the mounting member 25 by locking when the pin 22 is inserted into the bushing 23. Also the pin 22 includes a head part 26 and a shaft part 27 that extends from the head part 26, and the bushing 23 includes a flange 28 and a leg part 29 that extends from the flange 28. The leg part 29 has a shaft-part receiving opening 30 that receives the shaft part 27 of the pin 22, and this shaft-part receiving opening 30 is surrounded by an outer wall 31. A pair of opposing elastic engagement claws 32a, 32b are disposed on a pair of opposing wall portions 31a, 31b of the outer wall 31.

The elastic engagement claws 12a, 12b of the fixture 1 of the present invention (compare with the elastic engagement claws 32a, 32b of the fixture 21 of the prior art), elastically protrude outward from the outer wall 11. (Note that as shown in FIGS. 6 and 10, the openings 33 of the prior art fixture 21 for forming elastic engagement claws 32a, 32b define an engagement claw outer slot 34.) The elastic engagement claws 12a, 12b, when temporarily fixed, return elastically to protrude outward after bending temporarily inward in order to pass through the mounting holes of the attaching member 24 and the mounting member 25, and, when stopping, they are constructed so that bending inward is obstructed when the shaft part 7 is inserted into the shaft-part receiving openings 10.

Next, the fixture 1 of the present invention will be described regarding the differences between it and one fixture 21 of the prior art shown in FIGS. 6 to 9, and another fixture 41 of the prior art shown in FIG. 13.

Figure 1:
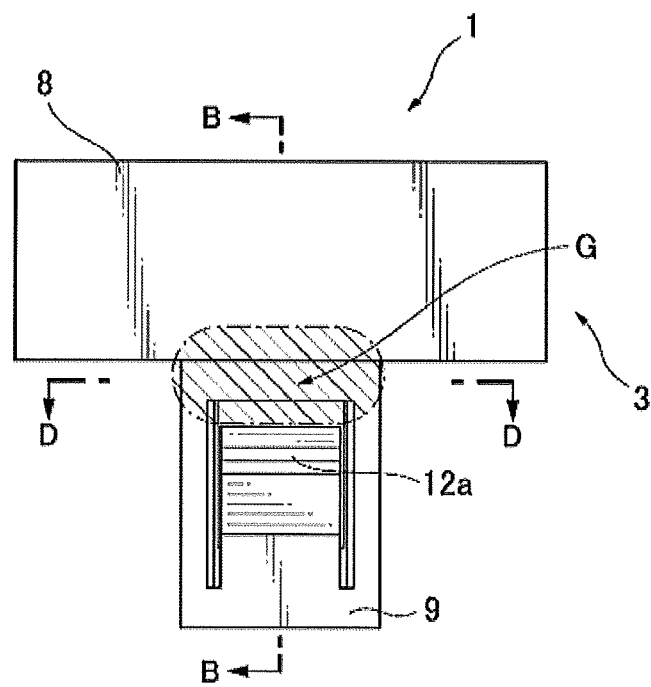
FIG. 1 is a front view of one embodiment of the fixture of the present invention.
Figure 2:
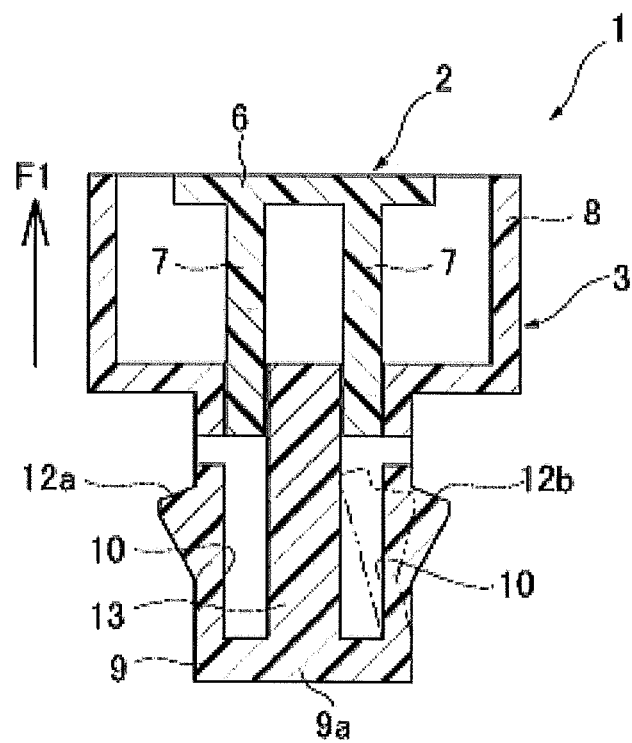
FIG. 2 is a cross-section view at the B-B arrow of FIG. 1 showing the situation before the fastening of the fixture of FIG. 1.
Figure 3:
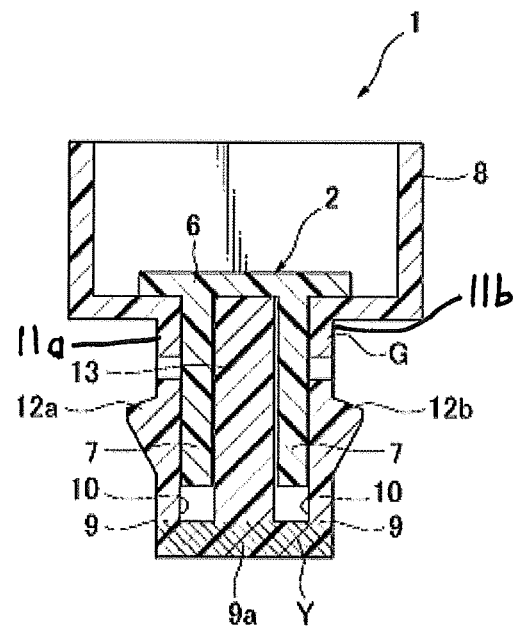
FIG. 3 is a cross-section view at the B-B arrow of FIG. 1 showing the situation after the fastening of the fixture of FIG. 1.
Figure 4:
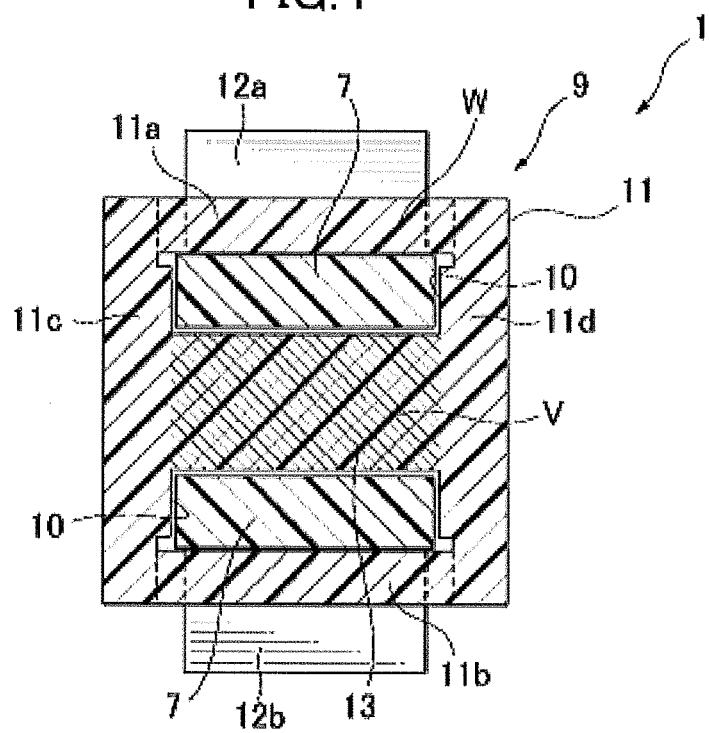
FIG. 4 is an enlarged cross-section view at the D-D arrow of FIG. 1.

The fixture 1 of the present invention is different from the fixture 21 of the prior art shown in FIGS. 6 to 9 in many respects. For one thing, as shown in FIGS. 2 to 4, the leg center column 13 of the fixture 1 of the present invention is disposed in the center of the shaft-part receiving openings 10. This leg center column 13 connects the pair of opposing outer wall portions 11a, 11b, where a pair of opposing elastic engagement claws 12a, 12b are disposed, with a pair of perpendicular outer wall portions 11c, 11d, and with each other. The leg center column 13, as shown in FIG. 2, is constructed such that, when the fixture 1 is temporarily fixed, the leg center column forms sufficient space from the outer wall 11 to allow the elastic engagement claws 12a, 12b to bend inward. The imaginary line shows the situation in which the elastic engagement claw 12b is bent inward.

Figure 13:
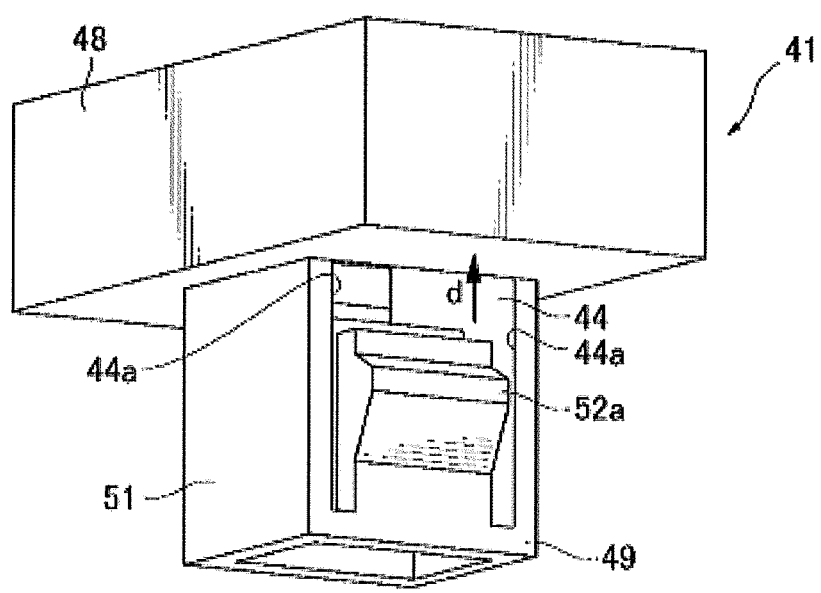
FIG. 13 is an outline oblique view similar to FIG. 5 showing another example of a fixture of the prior art.

The fixture 1 of the present invention also differs in many respects from another fixture 41 of the prior art shown in FIG. 13, for example, in that a portion of the outer wall 11 and the leg center column 13 defines a flange connecting part G (FIGS. 1 to 5) of the leg part 9 that connects the leg part with the flange 8. A portion of the outer wall 11 of the flange connecting part G forms a reinforcing arch above the opening 4 which defines the elastic engagement claws 12a, 12b, the reinforcing arch extending from one wall portion 11c to the other wall portion 11d. By contrast, in the other fixture 41 of the prior art shown in FIG. 13, the opening 44 disposed to form the elastic engagement claw 52a, different from the opening 4 of the fixture 1 of the present invention, reaches from the leg part 49 all of the way up to the underside of the flange 48. Thus, the other fixture 41 of the prior art lacks a reinforcing arch disposed above the opening 44.

Figure 14:
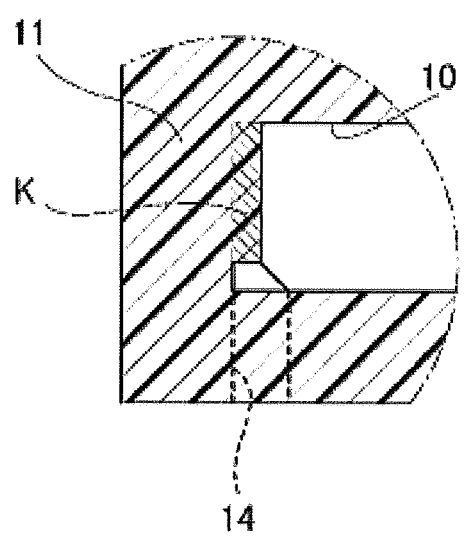
FIG. 14 is an enlargement of the circled portion E of FIG. 12.

Furthermore, the fixture 1 of the present invention, as shown in FIGS. 4, 12 and 14, also differs from the fixture 21 of the prior art in that the fixture 1 of the present invention is constructed so that the side cross sectional area of the leg part 9 is augmented by extending a portion of the wall 11 towards the shaft-part receiving openings 10 in order to approach the inner walls of the pair of outer wall portions 11c, 11d.

Inasmuch as the leg center column 13 is disposed in the center of the shaft-part receiving openings 10 on the fixture 1 of the present invention, the shaft-part receiving openings 10 include a pair of spaces divided by the leg center column 13.

Figure 7:
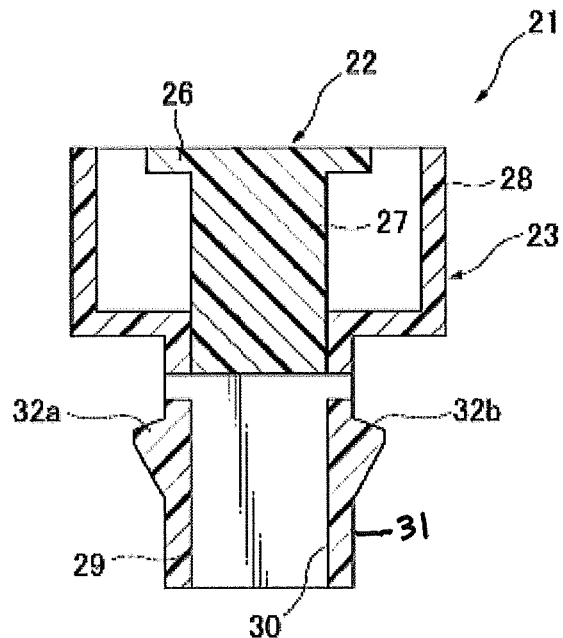
FIG. 7 is a cross-section view at the A-A arrow of FIG. 6 showing the situation before the fastening of the fixture of FIG. 6.
Figure 8:
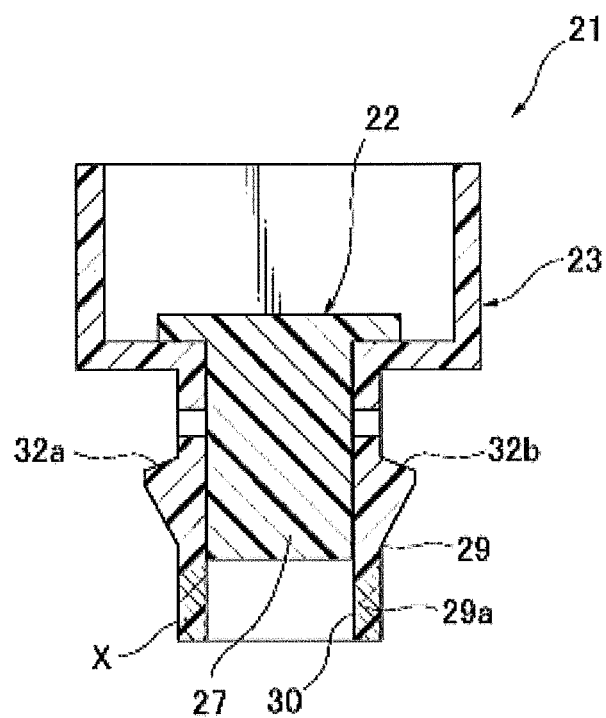
FIG. 8 is a cross-section view at the A-A arrow of FIG. 6 showing the situation after the fastening of the fixture of FIG. 6.

The fixture 1 of the present invention is further different from the fixture 21 of the prior art shown in FIGS. 6 to 9 in that an end part 9a opposite the flange connecting part G of the leg part 9 has a closed end construction in order to close off the shaft-part receiving openings 10. On the other hand, the end part 29a of the leg part 29 of the other fixture 21 of the prior art has an open end construction, as shown in FIGS. 7 and 8.

Next will be described the consequent differences in resistance to vertical stress, shear stress and torsional stress between the fixture 1 of the present invention and the fixtures 21 and 41 of the prior art.

Regarding vertical stress, when there is a vertical force applied to the leg part 9 perpendicular to the flange 8, as shown by the arrow F1 in FIG. 2, this vertical stress is received by the flange connecting part G (FIGS. 1, 3 and 5) of the leg part 9 and the flange 8 and by the end part 9a of the leg part 9.

Figure 9:
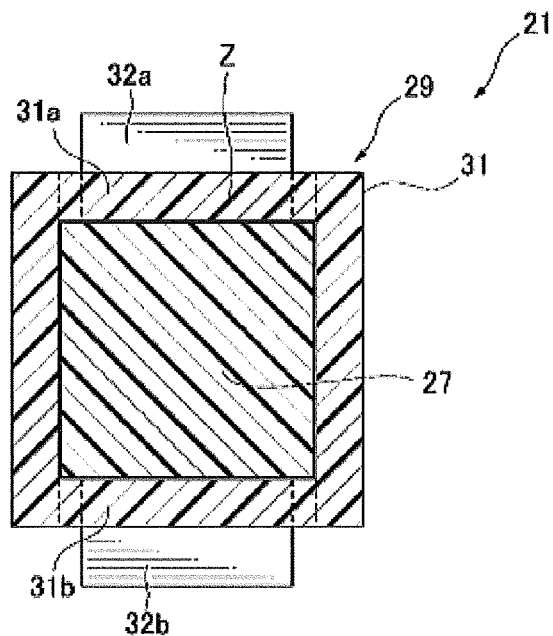
FIG. 9 is an enlarged cross-section view at the C-C arrow of FIG. 6.

Comparing FIG. 4 to FIG. 9, in the fixture 1 of the present invention, the cross section of the flange connecting part G of the leg part 9 that receives vertical stress F1 is larger than the corresponding part of the fixture 21 of the prior art. That is to say, in the construction of the fixture 21 of the prior art, vertical stress F1 is received by the pull of the cross section Z (FIG. 9). In contrast to this, in the construction of the fixture 1 of the present invention, the total cross section W (FIG. 4) receives the vertical stress F1. This cross section W includes the cross section Z of the prior art wall, augmented by the cross section V of the leg center column 13. Thus, according to the fixture 1 of the present invention, the resistance to vertical stress F1 is greater in comparison to that of the fixture 21 of the prior art shown in FIG. 6, because the cross-sectional area of the flange connecting part G of the leg part 9 has been thereby augmented.

Also, when comparing the fixture 1 of the present invention shown in FIG. 3 with the fixture 21 of the prior art shown in FIG. 8, the vertical stress on the end part 29a of the leg part 29 is received by the cross section X in the construction of the fixture 21 of the prior art, but it is received by the cross section Y in the construction of the fixture 1 of the present invention. Because the end part 9a of the fixture 1 of the present invention is a closed end, the cross sectional area of the cross section Y is greater than the cross-sectional area of the cross section X and, subsequently, the resistance to the vertical stress F1 is greater than that of the fixture 21 of the prior art.

Referring now to FIGS. 15 (prior art) and 16 (present invention), when the fixture 1 or 21 receives vertical stress F1, the bushing 3 or 23 receives the vertical stress F1 partly as a shear stress and partly as a pull force. In the fixture 21 of the prior art, the pull force is received or borne only by the outer wall 31 (FIG. 15). On the other hand, in the fixture 1 of the present invention, the pull force is received or borne both by the outer wall 11 and by the leg center column 13 (yielding the cross section B of FIG. 16). As a result, the location at which the bushing 23 of the fixture 21 of the prior art receives the shear stress, as shown in FIG. 15, is only on four small areas (cross section X) on the base point of the engagement claw outer slit 34 of the leg part 29, whereas the location at which the bushing 3 of the fixture 1 of the present invention receives shear stress, in addition to the cross section X of the bushing 23 of the fixture 21 of the prior art, is on two areas of the inner wall opposite the leg center column 13 of the outer wall portions 11a, 11b of the leg part 9 (cross section A in FIG. 16). Thus the resistance to vertical stress is greater in the fixture 1 of the present invention than that in the fixture 21 of the prior art.

Next will be described the resistance to shear stress of the fixture 1 of the present invention. In the prior art fixture 21 of FIG. 10, the shear stress enters a connecting part H of the flange 28 and leg part 29 as shown by arrow F2. When the shear stress enters, with the center c on the cross section of the connecting part, the resultant force works in a rotational direction about center c as shown by arrows a, b of FIG. 10, and is transformed into stress towards the pull directions a, b. At that time, as shown by arrow p in FIG. 11, the leg part 29 resists left half pull and right half pressure from the rotational center c. By contrast, in the fixture 1 of the present invention, as shown in FIG. 12, with the addition of the leg center column 13, the total cross section of leg part 9 is augmented by the area of cross section M, compared to the cross section of the left half and the right half, respectively, in the construction of the prior art leg part 29 in FIG. 11. Thus, the resistance to shear force is greater in the fixture 1 of the present invention than that in the fixture 21 of the prior art Furthermore, the fixture 1 of the present invention, as shown in FIGS. 4 and 12, is constructed so that the cross-sectional area of the leg part 9 is further augmented by extending a portion of the leg part towards the shaft-part receiving openings 10 so that the inner walls of the pair of outer wall portions 11c, 11d approach each other. Accordingly, as shown in FIG. 14, only the area of part of the cross section K increases compared to the outer wall 31 of the fixture 21 of the prior art. Generally, the leg part 9, which has engagement claws 12a, 12b, is constructed by making one part from combining a normal metal die forming the leg part and the metal die (i.e., slide metal die) forming the slit 14 around the engagement claw. Thus, by changing the coupled part of this slide metal die and the normal metal die forming the leg part 9, the position of the slit 14 around the engagement claw is able to change. Therefore, the position of the slit 14 around the engagement claw 12a can be disposed closer to the center of the shaft-part receiving openings 10 than in the prior art fixtures, so the thickness of the outer wall portions 11c, 11d can become greater. Accordingly, the cross section area of the leg part 9 of the fixture 1 of the present invention, for each outer wall portion, increases only at part of the cross section K (FIG. 14) in comparison to the cross sectional area Z of the leg part 29 of the fixture 21 of the prior art.

Next will be described the resistance to torsional stress of the fixture 1 of the present invention. FIG. 5 is a partial outline oblique view of the fixture 1 of the present invention; only the undersides of the flange 8 and the leg part 9 are shown. FIG. 13 is a similar outline oblique view of the other fixture 41 of the prior art. Torsional stress is the force added by one side onto the underside of the flange 48 as shown by arrow d in FIG. 13. As a consequence of the prior art construction in which the openings 44 are configured to form an elastic engagement claw 52a so that the openings reach from the leg part 49 all of the way to the underside of the flange 48 (as in this fixture 41), when this torsional stress force is added, the stress becomes concentrated on a ridge line 44a of the opening 44, which is an undesirable result.

On the other hand, in the fixture 1 of the present invention, as shown in FIG. 5, such an opening 4 does not extend from the leg part 9 to the underside of the flange 8. Instead, a portion of wall 11 of the flange connecting part G of the leg part 9 above the elastic engagement claw 12a forms a reinforcing arch over the top of the opening 4 that extends completely over the opening from one wall to the opposing wall. This provides the fixture 1 of the present invention with a resistance to torsional stress not present in the other fixture 41 of the prior art. (It should be noted that, as shown in FIG. 5, the opening 4 defines a slit 14 around the engagement claw 12a.)

It will be appreciated by persons skilled in the art that the above embodiments have been described by way of example only, and not in any limitative sense, and that various alterations and modifications are possible without departure from the scope of the present invention as defined by the appended claims.

What is claimed is:

1. A fixture for fastening an attaching member to a mounting member, comprising:
    a pin and a bushing, the bushing being configured for temporarily fixing the bushing to the attaching member and a mounting member;
    the pin being configured for insertion into the bushing and including a head part and a shaft part extending from the head part;
    the bushing including a flange and a leg part extending from the flange;
    the leg part defining shaft-part receiving openings that receive the shaft part of the pin;
    the leg part further defining an outer wall that surrounds the shaft-part receiving openings;
    the outer wall including one pair of opposing wall portions connected to another pair of opposing wall portions disposed perpendicular to the one pair of opposing wall portions;
    each wall portion of the one pair of opposing wall portions including an opening, the opening defining an elastic engagement claw engageable with mounting holes of the attachment member and the mounting member;
    a leg center column disposed in the center of the shaft-part receiving openings, the leg center column connecting the one pair of opposing wall portions with the other pair of opposing wall portions;
    each wall portion of the one pair of opposing wall portions, and the leg center column, defining a flange connecting part of the leg part, the flange connecting part connecting the leg part to the flange;
    a portion of each of the one pair of opposing wall portions defining the flange connecting part also including a reinforcing arch disposed above the opening defining said elastic engagement claw, the reinforcing arch extending from one of said other wall portions to the other of said other wall portions; whereby
    the reinforcing arch enhances the ability of the fixture to resist torsional stress.

2. The fixture of claim 1, wherein:
    the leg part opposite the flange connecting part of the leg part includes an end part; and wherein
    the end part has a closed end construction in order to close off the shaft-part receiving openings; whereby
    the ability of the fixture to resist vertical stress is enhanced.

3. The fixture of claim 2, wherein:
    the leg part outer walls having a square cross-section; and wherein
    the leg center column connects said other pair of outer wall portions with said one pair of outer wall portions, and with each other.

4. The fixture of claim 2, wherein the shaft-part receiving openings of the leg part includes a pair of spaces divided into parts by the leg center column, and the shaft parts of the pin are bifurcated in order to be received into the spaces.

5. The fixture of claim 2, wherein:
    the elastic engagement claws protrude elastically outward from the outer wall, such that, when temporarily fixed, the elastic engagement claws return elastically to protrude outward after bending temporarily inward in order to pass through the mounting holes of the attaching member and the mounting member and, when locking, they are constructed so that bending inward is obstructed when the shaft parts have been inserted into the shaft-part receiving openings, thereby locking the fixture to the attaching member and the mounting member.

6. The fixture of claim 2, wherein the leg center column, when temporarily fixed, is constructed so that it forms enough space between opposing wall portions for the elastic claws to bend inward.

7. The fixture of claim 1, wherein the cross-sectional area of the leg part is augmented by extending a portion of the leg part towards the shaft-part receiving openings so that inner walls of a pair of wall portions approach each other, thereby enhancing the ability of the fixture to resist shear stress.

* * * * *